(12) United States Patent
Kurmala et al.

(10) Patent No.: US 9,736,719 B2
(45) Date of Patent: Aug. 15, 2017

(54) ADAPTIVE RESOURCE ALLOCATION IN CONGESTED WIRELESS LOCAL AREA NETWORK DEPLOYMENT

(71) Applicant: Aruba Networks, Inc., Sunnyvale, CA (US)

(72) Inventors: Hari Krishna Kurmala, Sunnyvale, CA (US); Ramesh Ardeli, Sunnyvale, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 231 days.

(21) Appl. No.: 14/610,624

(22) Filed: Jan. 30, 2015

(65) Prior Publication Data

US 2016/0227552 A1 Aug. 4, 2016

(51) Int. Cl.
| | |
|---|---|
| *H04L 12/26* | (2006.01) |
| *H04W 28/02* | (2009.01) |
| *H04W 48/02* | (2009.01) |
| *H04W 84/12* | (2009.01) |
| *H04W 48/06* | (2009.01) |

(52) U.S. Cl.
CPC ....... *H04W 28/0231* (2013.01); *H04W 48/02* (2013.01); *H04W 48/06* (2013.01); *H04W 84/12* (2013.01)

(58) Field of Classification Search
CPC . H04W 28/0231; H04W 48/02; H04W 48/06; H04W 84/12
See application file for complete search history.

(56) References Cited

U.S. PATENT DOCUMENTS

| | | | | |
|---|---|---|---|---|
| 6,947,445 | B1* | 9/2005 | Barnhart | H04B 7/18584 370/232 |
| 2002/0147011 | A1* | 10/2002 | Kay | H04L 47/14 455/427 |
| 2003/0086140 | A1* | 5/2003 | Thomas | H04J 14/0282 398/167.5 |
| 2005/0053046 | A1* | 3/2005 | Wang | H04L 12/4645 370/338 |
| 2008/0049641 | A1* | 2/2008 | Edwards | H04L 12/66 370/253 |
| 2008/0052393 | A1* | 2/2008 | McNaughton | H04L 12/66 709/224 |
| 2012/0207032 | A1* | 8/2012 | Chen | H04W 28/18 370/252 |
| 2012/0236716 | A1* | 9/2012 | Anbazhagan | H04L 41/5022 370/235 |

(Continued)

*Primary Examiner* — Jay P Patel
(74) *Attorney, Agent, or Firm* — Hewlett Packard Enterprise Patent Department

(57) ABSTRACT

The present disclosure discloses a method and a network device for adaptive resource allocation in congested wireless local area network deployment. Specifically, a network device dynamically assigns priorities of client devices associated with a remote access point based at least on an application type or a traffic type corresponding to each client device. Further, the network device transmits the priorities of the client devices to the remote access point in response to the wired uplink being unavailable. The priorities of the client devices facilitate the remote access point to limit a number of client devices connected to the remote access point subsequent to the wired uplink being unavailable.

20 Claims, 6 Drawing Sheets

(56) References Cited

U.S. PATENT DOCUMENTS

| | | | |
|---|---|---|---|
| 2014/0313901 A1* | 10/2014 | Yacovitch | H04W 28/12 370/236 |
| 2015/0124611 A1* | 5/2015 | Attar | H04L 47/283 370/235 |
| 2015/0143456 A1* | 5/2015 | Raleigh | H04W 12/08 726/1 |
| 2015/0223160 A1* | 8/2015 | Ho | H04W 48/20 370/338 |

* cited by examiner

APPLICATION MAPPING TABLE
200

| APPLICATION 220 | APPLICATION CATEGORY 240 | ACCESS CATEGORY 260 | PRIORITY 280 |
|---|---|---|---|
| Gmail | Webmail | Back-ground | Lowest ↓ Highest |
| Bit torrent | Peer-to-Peer | Back-ground | |
| eDonkey | Peer-to-Peer | Back-ground | |
| Yahoo Messenger | Instant-messaging | Best-effort | |
| WhasApp | Instant-messaging | Best-effort | |
| WeChat | Instant-messaging | Best-effort | |
| Twitter | Web | Best-effort | |
| Facebook | Web | Best-effort | |
| YouTube | Web | Non-enterprise Video | |
| Netflix | Audio-video | Non-enterprise Video | |
| Skype | Instant-messaging | Non-enterprise Video | |
| GoToMeeting | Audio-video | Enterprise Video | |
| WebEx | Audio-video | Enterprise Video | |
| Adobe-Connect | Audio-video | Enterprise Video | |
| Lync-video | Audio-video | Enterprise Video | |
| Gtalk | Instant-messaging | Voice | |
| Jabber | Instant-messaging | Voice | |
| Lync-audio | Audio-video | Voice | |

FIG. 2

| CLIENT PRIORITY TABLE 300 | | NUMBER OF SESSIONS 360 | | |
|---|---|---|---|---|
| CLIENT NAME 320 | CLIENT MAC 340 | ENTERPRISE VOICE 370 | ENTERPRISE VIDEO 380 | CLIENT PRIORITY 390 |
| C1 | AA:BB:CC:DD:EE:01 | 1 | 2 | 14 |
| C2 | AA:BB:CC:DD:EE:02 | 2 | 1 | 22 |
| C3 | AA:BB:CC:DD:EE:03 | 3 | 0 | 30 |
| C4 | AA:BB:CC:DD:EE:04 | 0 | 2 | 2 |
| C5 | AA:BB:CC:DD:EE:05 | 1 | 1 | 12 |

FIG. 3

ADAPTIVE RESOURCE ALLOCATION IN CONGESTED WIRELESS LOCAL AREA NETWORK DEPLOYMENT

FIELD

Embodiments of the present disclosure relate to network resource allocation. In particular, embodiments of the present disclosure describe a method and system for providing adaptive resource allocation in congested wireless local area network deployment.

BACKGROUND

Remote Access Point (RAP) has an Ethernet as its primary uplink and a cellular uplink, e.g., a 3G/4G link, as a backup uplink in the event that the Ethernet uplink is unavailable. However, the bandwidth of a RAP's cellular (e.g., 3G/4G) uplink is much lower than the bandwidth of the RAP's Ethernet uplink.

A RAP will failover to the cellular (e.g., 3G/4G) uplink when a network controller is not reachable over the RAP's Ethernet uplink. When the RAP uplink switches to the cellular (e.g., 3G/4G) uplink, the uplink WLAN bandwidth is limited. Therefore, the WiFi traffic from end users will create a bottleneck and/or congestion over the RAP's cellular (e.g., 3G/4G) uplink. End user experience can become miserable depending on the type of the applications they are running. Low latency applications, such as, voice calls, may even drop due to the uplink congestion. Also, live streaming will experience jittering resulting in bad end user experience as well. Currently, there is no mechanism in place for RAP to intelligently adapt to such situations when the RAP's uplink is congested, e.g., after a failover from the Ethernet uplink to the 3G/4G uplink.

DETAILED DESCRIPTION

In the following description, several specific details are presented to provide a thorough understanding. While the context of the disclosure is directed to network resource allocation, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 2 shows a diagram illustrating an exemplary application mapping table according to embodiments of the present disclosure.

FIG. 3 shows a diagram illustrating an exemplary client priority table according to embodiments of the present disclosure.

OVERVIEW

Embodiments of the present disclosure relate to network resource allocation. In particular, embodiments of the present disclosure describe a method and network device for adaptive resource allocation in congested wireless local area network deployment.

In general, when a RAP's uplink switches from a high bandwidth Ethernet uplink to a low bandwidth cellular uplink (e.g., a 3G/4G uplink), embodiments of present disclosure can take one or more of the following actions: (1) limit total number of clients that can be associated to the RAP; (2) prioritize a list of clients which are allowed to associate to RAP among others; (3) limit bandwidth assigned per client; and/or (4) allow only important applications (e.g., enterprise voice traffic and/or enterprise video traffic) and drastically limit other types of applications (e.g., best effort traffic and/or background traffic).

With the solution provided herein, a network device dynamically assigns priorities of client devices associated with a remote access point based at least on an application type or a traffic type corresponding to each client device. Further, the network device transmits the priorities of the client devices to the remote access point in response to the wired uplink being unavailable. The priorities of the client devices facilitate the remote access point to limit a number of client devices connected to the remote access point subsequent to the wired uplink being unavailable.

Network Computing Environment

Figure 1:
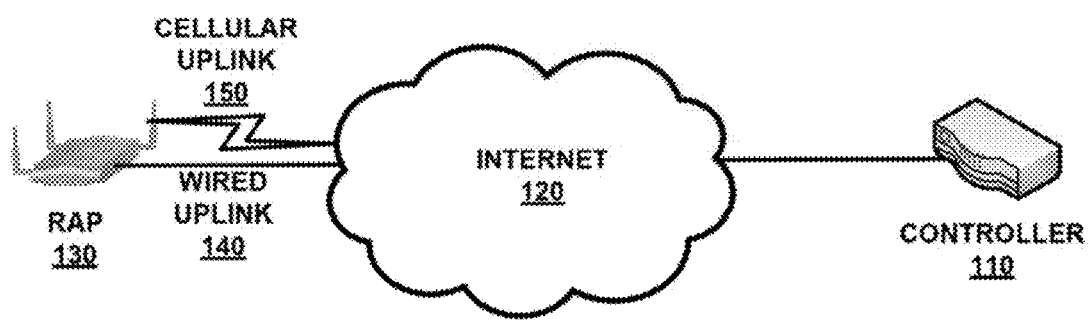
FIG. 1 shows an exemplary network environment according to embodiments of the present disclosure.

FIG. 1 shows an exemplary network environment according to embodiments of the present disclosure. Specifically, FIG. 1 illustrates a network that includes at least a network controller 110, Internet 120, and a remote access point (RAP) 130. RAP 130 is typically connected to network controller 110 via a wired uplink 140. In some embodiments, wired uplink 140 can be an Ethernet uplink supporting a high bandwidth (e.g., a 1 Gbps uplink). Moreover, RAP 130 can alternatively be connected to network controller 110 via a cellular uplink 150. In some embodiments, cellular uplink 150 can be a 3G uplink or a 4G uplink that supports a lower bandwidth (e.g., <50 Mbps) than wired uplink 140. Usually, cellular uplink 150 is used temporarily as a backup uplink when the high bandwidth uplink, e.g., wired uplink 140, is unavailable.

Network controller 110 generally refers to a controlling device that manages other network devices such as wireless access points. Network controller 110 may handle automatic adjustments to radio frequency power, wireless channels, wireless authentication, and/or security, and deliver essential mobility services such as AppRF™ technology for OSI Layer 4-7 application control, multicast Domain Name System (DNS) optimization, IP roaming, and Security Assertion Markup Language (SAML) integration based on user roles, devices, applications and location. Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

Access points (APs) generally refer to a set of wireless network devices that allow wireless client devices to connect to a wired network using IEEE 802.11 or related standards. The APs usually connect to a router via a wired network, but can also be an integral component of the router itself. Access point is usually designed to handle a certain number of sessions belonging to various access categories while conforming to acceptable user experience. A RAP is an access point that is deployed in a remote branch (e.g., a satellite office or home office) rather than a central network (e.g., a corporate campus).

Each access point serves one or more client devices. Each client device may be executing an application session that belongs to one or more access categories. During operations, a RAP may be able to support only a limited number of sessions from a particular access category, especially when there is limited bandwidth supported by the RAP's uplink. Since voice sessions are latency and/or jitter sensitive, an end user will experience delay if an access point handles more than its designed capacity. Similarly, video sessions could experience buffering. Thus, if more client devices start simultaneous video sessions on the same AP beyond its capacity, the client devices will have poor network experience. Therefore, the maximum limits are defined for each access category for an access point based on a number of factors. The factors may include, but are not limited to: (a) a total number of bands supported; (b) the processor's capacity in AP; (c) the WiFi connection type (11n/11ac).

Profiles Based on 3G and 4G as Uplink

Network controller can maintain different profiles for cellular (e.g., 3G/4G uplink) uplink connections. These profiles define maximum number of client devices allowed to be connected to each RAP when on the RAP has switched from a wired (e.g., Ethernet) uplink to a cellular (e.g., 3G/4G) uplink (hereinafter referred to as "MaxClients").

Moreover, the profiles also define a list of allowed client devices. For example, a network administrator can configure an address list consist of MAC addressed of client devices that are allowed to associate with the RAP when the RAP has switched from a wired high bandwidth uplink to a cellular low bandwidth uplink (hereinafter referred to as "AllowedClientList").

Furthermore, the profiles can define bandwidth contract assignment for each client device, which indicates the maximum bandwidth that a particular client device can use per second when the RAP has switched from a wired high bandwidth uplink to a cellular low bandwidth uplink (hereinafter referred to as "BW-Per-Client"). Specifically, the profiles can specify how much upstream bandwidth and how much downstream bandwidth can be allowed for the particular client device with a high bandwidth uplink connection and/or with a low bandwidth uplink connection. Note that, the bandwidth assignment can be specified on a per-user basis, on a per-role basis, or on a per-application basis. When the bandwidth is specified on a per-role basis, all of the users assigned to a particular user role will share the specified bandwidth. If the bandwidth is specified on a per-user basis, every user will be allowed to use up to the specified bandwidth. When the bandwidth is specified on a per-application basis, the particular type of application running on every client device will be subject to the specified maximum bandwidth.

Also, the profiles may define additional firewall rules. Such firewall rules can define applications and/or application categories that a RAP may permit upon switching from a wired high bandwidth uplink to a cellular low bandwidth uplink (hereinafter referred to as "FW-Rules"). Thus, certain types of application traffic (e.g., Youtube® applications) may not be allowed to run if the RAP has switched from an Ethernet uplink to a 3G/4G uplink. Likewise, certain traffic types may be blocked when the RAP fails over from wired uplink to 3G/4G uplink.

Finally, the profiles can include client priorities as described in the sections below. Unlike the above attributes in the profiles, the client priorities are dynamically calculated after the RAP detects a low bandwidth uplink (e.g., 3G/4G uplink). Further, the client priorities are calculated only for the client devices that are currently connected to the RAP based on the number of enterprise voice sessions and the number of enterprise video sessions that each client device is currently running when the RAP detects the 3G/4G uplink.

Application Classification

The deep packet inspection (DPI) engine running on a network controller classifies the sessions after processing one or more data packets. When a new session is created, the network controller shall perform deep packet inspection (DPI) to determine the application type that the session belongs to. Since not all applications are classified as belonging to a particular application on the receipt of first data packet, it may take a number of received packets (e.g., up to 7 packets) for the network controller to classify a session. In some embodiments, the session is partially classified. It implies that the DPI engine needs more data packets to determine the final classification for the session. In some embodiments, the session is terminally classified, and thus the session is finally marked with the corresponding application identifier.

Application to Access Category Mapping

Network controller can maintain an application or application-category to access-category mapping table for all the applications and/or application-categories supported. FIG. 2 shows exemplary application mapping table according to embodiments of the present disclosure. Application mapping table 200 in FIG. 2 includes at least an application field 220, an application category field 240, an access category field 260, and a priority field 280.

Application field 220 indicates the specific application, e.g., GMail®, BitTorrent®, eDonkey®, Yahoo® Messenger, WhatsApp®, WeChat®, Twitter®, Facebook®, Youtube®, Netflix®, Skype®, GoToMeeting®, WebEx®, Adobe-Connect®, Lync® video, GTalk®, Jabber®, Lync® audio, etc.

Application category field 240 indicates the category corresponding to each application, including but not limited to, webmail, web, instant messaging, peer-to-peer, audio-video, etc.

Access category field 260 indicates a corresponding service category for each application. Note that, IEEE 802.11e standard specifies the following four access-categories for classifying various traffic types: (1) Voice, (2) Video, (3) Best-effort, and (4) Background.

Furthermore, an application can be categorized as an enterprise application used heavily for business needs, or a non-enterprise application, used by employees for personal needs. All applications can be categorized as enterprise or non-application application based on their importance to an organization. In addition, because a voice application is sensitive to latency and/or jitter rather than bandwidth, all voice applications can be put in one single category. On the other hand, a video application requiring high bandwidths can be categorized into (a) streaming, (b) enterprise online-conference, and/or (c) personal online-conference.

Thus, all the applications can be categorized into a number of categories, including but not limited to, background access, best effort access, non-enterprise video access, enterprise video access, voice access, etc. A network controller can maintain the application and/or application-category to access-category mapping table shown in FIG. 2 for all applications and application-categories supported in the system. This exemplary mapping can be overridden or replaced by an enterprise customer, and thus providing the flexibility to a network administrator to define its own customized mappings. The default mapping from an application/application-category to access-category for some of the applications is shown in FIG. 2. This default mapping can be overridden by the customer through CLI/GUI to meet their needs. In some embodiments, if the client devices in the network have been steered to neighboring APs too frequently, the network controller can dynamically adjust the configurable threshold value indicating the minimum acceptable SNR value to be lower than the current value.

Once the session is terminally classified as belonging to a particular application, the network controller's stateful firewall architecture can map the session to one of these five access categories based on the application to which this session is classified as.

Client Priority Table

Apart from profile-based configuration described above, the network controller also maintains dynamically calculated priorities of each client device based on what sessions each client is currently handling in a Client Priority Table. FIG. 3 illustrates an exemplary client priority table according to embodiments of the present disclosure. Client priority table 300 as illustrated in FIG. 3 includes at least the following fields: client name 320, client MAC address 340, number of sessions 360, etc. Specifically, number of sessions 360 can be sub-classified to number of enterprise voice sessions 370 and number of enterprise video sessions 380.

The network controller shall maintain client priority table 300, which is a lookup table indexed on a client device's MAC address. Client priority table 300 tracks the number of sessions falling in the top two access categories, e.g., enterprise voice sessions and enterprise video sessions currently in transit for each client device. Once the session is terminally classified as a particular application, depending on the application-to-access-category mapping, the corresponding counter is incremented for the client device. Similarly, when the session is aged out, the corresponding counter is decremented for the client device. Weightage is given to each voice and/or video session. Correspondingly, a client priority 390 is calculated dynamically for each client device. These weightages are configurable by a network administrator.

Based at least on number of enterprise voice sessions 370 and number of enterprise video sessions 380, the network controller can determine a client device's priority 390. For example, assuming that:

Weightage given to Voice Session=Vow
Weightage given to Video Session=Viw
Number of Voice Sessions=Von
Number of Video Session=Vin
Client priority=Vow*Von+Viw*Vin In Client Priority Table 300, client priority 390 is calculated based on vow=10, viw=2. Moreover, the number of high priority clients that can be selected from Client Priority Table 300 is calculated as:

NumOfHighPriorityClients=MaxClients−AllowedClientList

These high priority clients are also allowed to access network when uplink is detected as a cellular or low bandwidth uplink (e.g., a 3G/4G uplink). The number of high priority clients that can be selected from Client Priority Table 300 is limited by two parameters configured—(1) MaxClients; and (2) AllowedClientList.

If none of the client devices are running any enterprise voice session or enterprise video session, then all of the client devices are treated with equal priority.

As illustrated in FIG. 3, the client device C1 with MAC address of AA:BB:CC:DD:EE:01 has a number of applications running on the device. Among them, one application is categorized as enterprise voice session 370; and two applications are categorized as enterprise video session 380. Because, in this example, each enterprise voice session is given a weight of 10 and each enterprise video session is given a weight of 2, the client device C1 has a client priority of 1*10+2*2=14. Similarly, client priority 390 can be calculated for C2-C5 based on their respective enterprise voice sessions and enterprise video sessions currently in transmit. Therefore, after calculating client priority 390 for each client device, the network controller will be giving RAP's current client devices the following priority: C3>C2>C1>C5>C4.

In some embodiments, in addition to traffic types described above, the network controller can also prioritize client devices based on the application types. For example, for the voice sessions, a network administrator may configure Lync® audio sessions to have a higher priority than Jabber® sessions, because Lync® application is endorsed and thus preferred for corporate use in the network. Similar to traffic types, a network administrator can configure a weight for each specific application types, and the network controller can determine a client priority based on the number of sessions per application currently running on each client device.

In some embodiments, a network administrator can statically configure a list of client devices that are always allowed in the event that the RAP switches from a high bandwidth uplink to a low bandwidth uplink. Specifically, in some embodiments, the network administrator can provide a list of MAC addresses for the allowed client devices. In some embodiments, the network administrator can provide a list of user identifiers corresponding to the allowed client devices. In some embodiments, the network administrator can specify a set of user roles corresponding to the allowed client devices.

Adaptive Resource Allocation by RAP

The network controller maintains AllowedClientList configured under the 3G/4G profile as described in the above sections. Also, NumOfHighPriorityClients can be obtained from Client Priority Table 300. Initially, the RAP establishes a secure connection (e.g., an IPSec connection) to the network controller over Ethernet.

When RAP subsequently detects that the connectivity to the network controller is lost, it will failover to the 3G/4G uplink and tries to reestablish the secure connection (e.g., IPSec connection) to the network controller. Once the RAP successfully establishes the connection with the network controller over the 3G/4G uplink, the network controller pushes all configurations, which include at least the 3G/4G profiles and the Client Priority Table 300 to RAP. The RAP then performs a lookup on the received configuration information, and determines whether to allow or disallow a particular client device accordingly.

Process for Adaptive Resource Allocation in Congested WLAN Deployment

Figure 4:
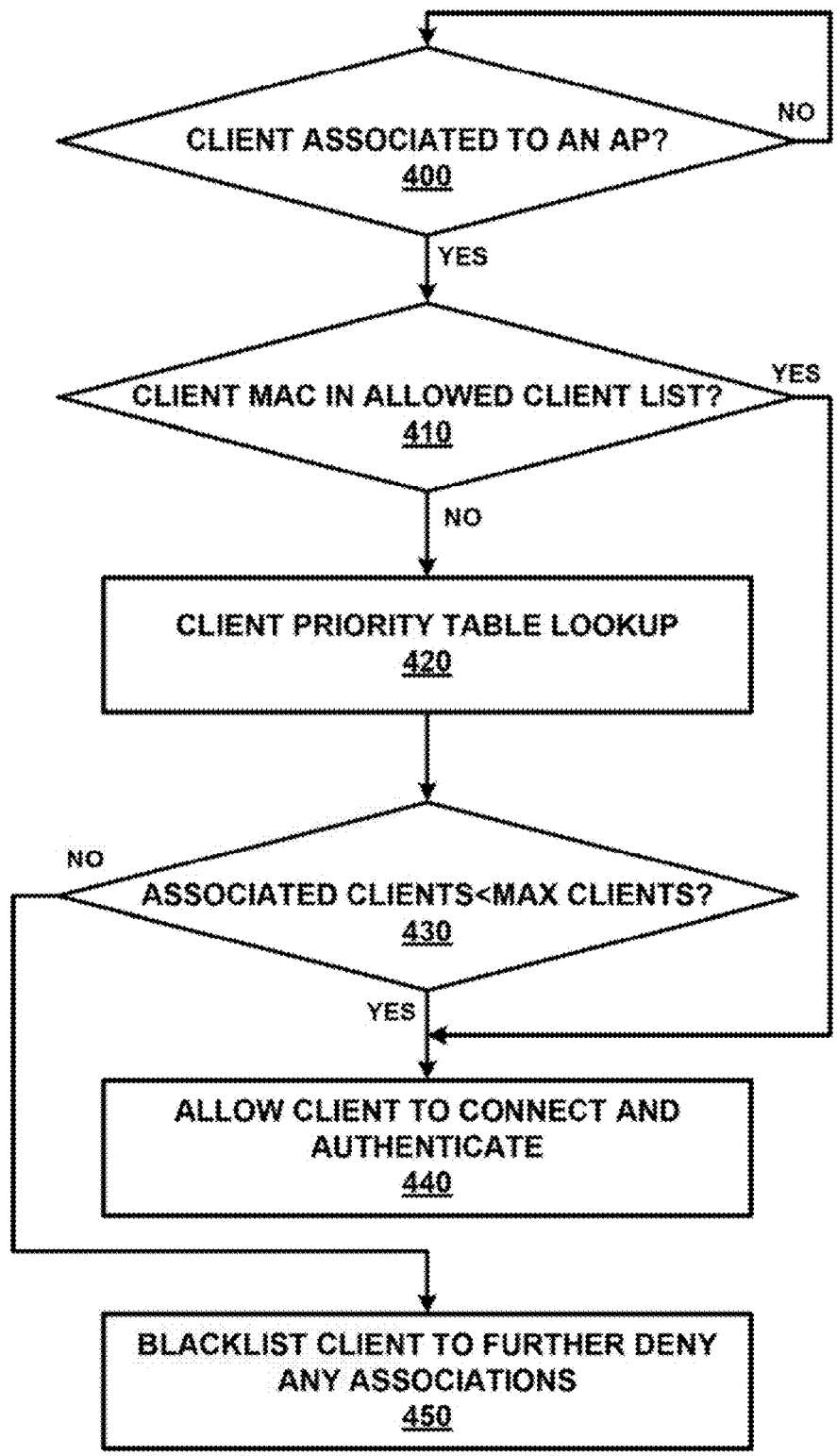
FIG. 4 shows a sequence diagram illustrating an exemplary adaptive resource allocation process in congested wireless local area network deployment according to embodiments of the present disclosure.
Figure 5:
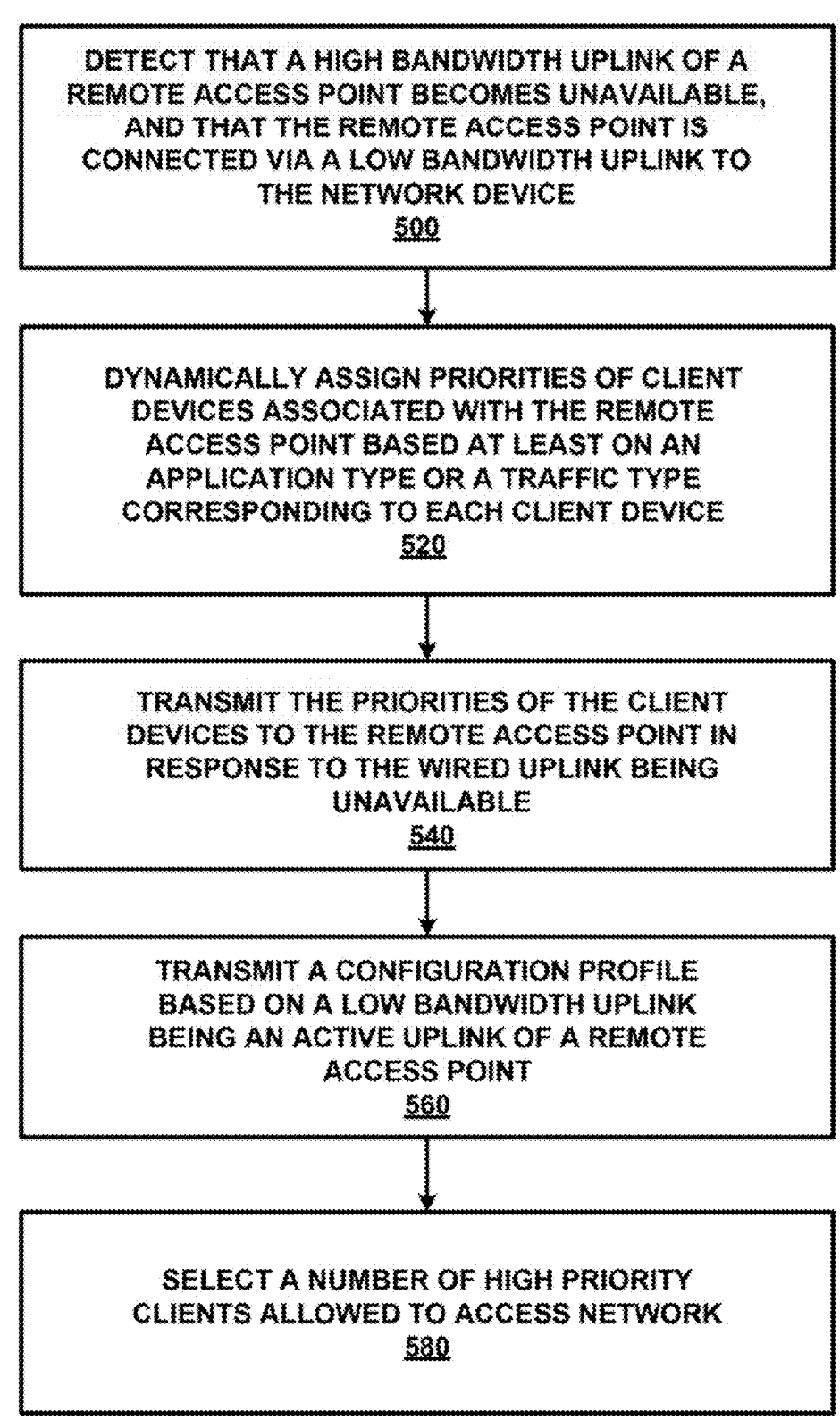
FIG. 5 shows a sequence diagram illustrating an exemplary adaptive resource allocation process in congested wireless local area network deployment according to embodiments of the present disclosure.

FIGS. 4-5 illustrate exemplary processes for providing adaptive resource allocation in congested WLAN deployment according to embodiments of the present disclosure. Specifically, in FIG. 4, a network device (e.g., a remote access point) determines whether a client device is associated with an access point (operation 400). If not, the network device repeats this operation until detecting a client device associated with the access point. If yes, the network device further determines whether the MAC address of the client device is in an allowed client list (operation 410). If so, the network device will allow the client device to connect and authenticate the client device (operation 440). If not, the network device next performs a client priority table lookup (operation 420). Then, the network device determines whether the total number of client devices associated with the access point is less than the maximum allowed number of client devices (operation 430). If the total number of client devices associated with the access point exceeds the maximum allowed number of client devices, the network device will blacklist the client device to further deny any association requests from the same client device in the near future (operation 450). If, however, the total number of client devices associated with the access point is less than the maximum allowed number of client devices, the network device will allow the client device to connect to the access point and authenticate the client device (operation 440).

FIG. 5 illustrates another process for adaptive resource allocation in congested WLAN deployment. During operations, a network device (e.g., a network controller) detects that a high bandwidth uplink of a remote access point becomes unavailable, and that the remote access point is connected via a low bandwidth uplink to the network device (operation 500). Also, the network device dynamically assigns priorities of client devices associated with the remote access point based at least on an application type or a traffic type corresponding to each client device (operation 520). Moreover, the network device transmits the priorities of the client devices to the remote access point in response to the wired uplink being unavailable (operation 540). Further, the network device transmits a configuration profile based on a low bandwidth uplink being an active uplink of a remote access point (operation 560). In addition, the network device may select a number of high priority clients allowed to access network in response to detecting that an uplink of a remote access point is a low bandwidth uplink (operation 580).

Here, the priorities are assigned based on the configuration profile, and facilitate the remote access point to limit a number of client devices connected to the remote access point subsequent to the wired uplink being unavailable.

In some embodiments, the profile includes a maximum number of client devices allowed to be connected to a remote access point in response to the remote access point being connected via a low bandwidth uplink to a network device.

In some embodiments, the profile includes a preconfigured list of client device identifiers identifying a subset of client devices that are allowed to associate with a remote access point in response to the remote access point being connected via a low bandwidth uplink to a network device.

In some embodiments, the profile includes a bandwidth assignment for each client device indicating a maximum bandwidth that each client device associated with a remote access point is allowed to use in response to the remote access point being connected via a low bandwidth uplink to a network device. The bandwidth assignment may include at least a maximum upstream bandwidth and a maximum downstream bandwidth. Also, the maximum upstream bandwidth may be different from the maximum downstream bandwidth.

In some embodiments, the bandwidth assignment is defined on a per-user basis in which the amount of bandwidth used by each user is subject to a predefined value. In some embodiments, the bandwidth assignment is defined on a per-role basis in which all users assigned to a same user role share a predefined amount of bandwidth. In some embodiments, the bandwidth assignment is defined on a per-application basis in which the amount of bandwidth used by an application running on each client device is subject to a predefined value.

In some embodiments, the profile includes a set of firewall rules that define a set of applications or application categories that a remote access point may permit in response to the remote access point being connected via a low bandwidth uplink to a network device.

In some embodiments, the profile includes client priorities that are dynamically calculated in response to the remote access point being connected via a low bandwidth uplink to a network device. The client priorities can be calculated based at least on a number of enterprise video sessions and a number of enterprise voice sessions that each client device is running.

In some embodiments, an application running on the client devices belongs to an application access category that comprises a voice access category, a video access category, a best effort access category, and a background access category. In some embodiments, an application running on the client devices belongs to one of an enterprise category or a non-enterprise category.

In some embodiments, the priorities are calculated based on the sum of a number of voice sessions weighted by a first weightage given to the voice sessions and a number of video sessions weighted by a second weightage given to the video sessions.

In some embodiments, the number of high priority clients is determined by a difference between a maximum allowed clients and an allowed client list. Note that, the allowed client list is (1) statically configured by a network administrator as a list of MAC addresses for the allowed client devices; (2) configured by the network administrator as a list of user identifiers corresponding to the allowed client devices; or (3) configured by the network administrator based on a set of user roles corresponding to the allowed client devices.

System for Adaptive Resource Allocation in Congested WLAN Deployment

Figure 6:
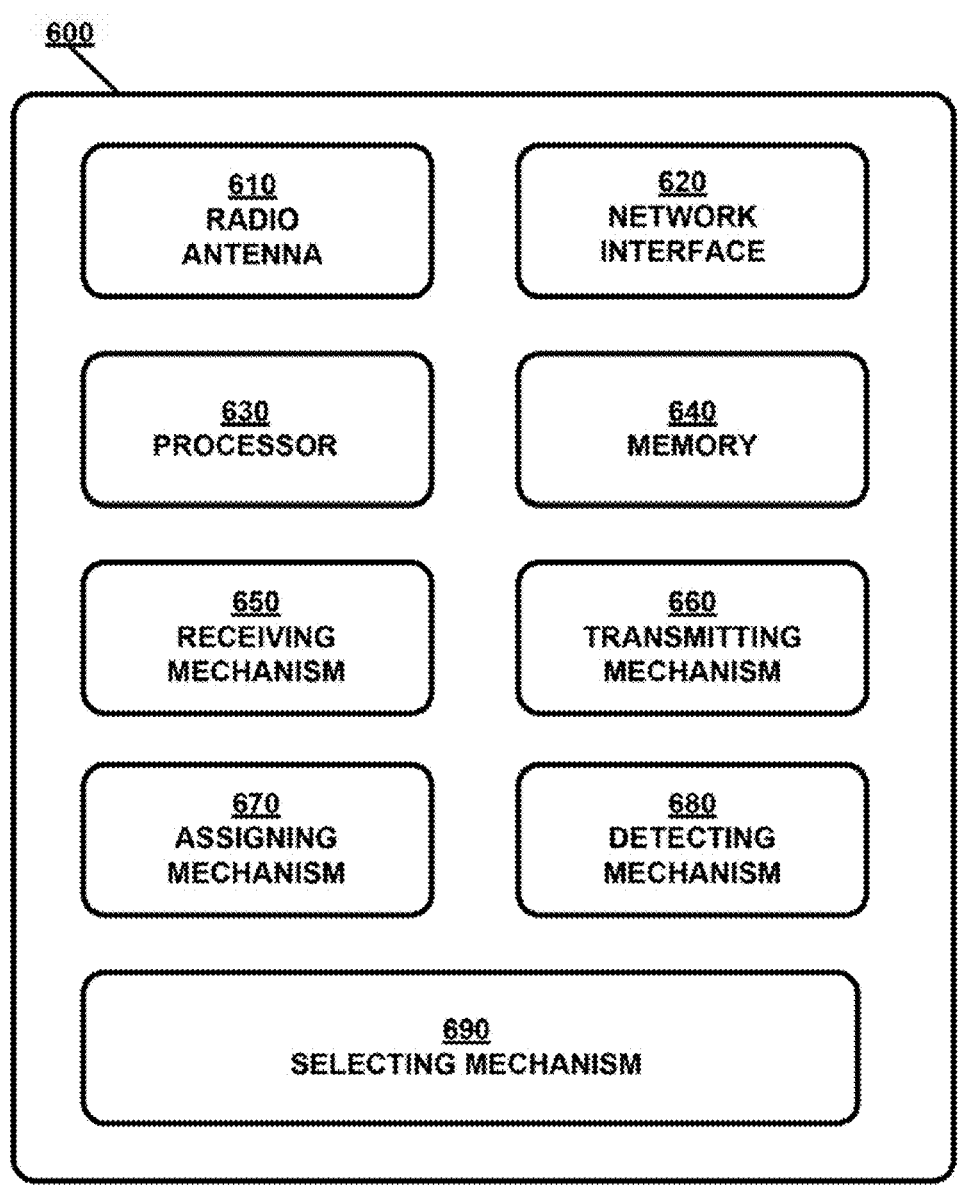
FIG. 6 is a block diagram illustrating an exemplary system for adaptive resource allocation in congested wireless local area network deployment according to embodiments of the present disclosure.

FIG. 6 is a block diagram illustrating an exemplary system for adaptive resource allocation in congested WLAN deployment according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a assigning mechanism 670, a detecting mechanism 680, and a selecting mechanism 690, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on.

Transmitting mechanism 660 generally transmits messages, which include, but are not limited to, requests and/or responses, beacon frames, management frames, control path frames, and so on. Specifically, transmitting mechanism 660 can transmit the priorities of the client devices to a remote access point in response to a wired uplink being unavailable. Here, the priorities of the client devices facilitate the remote access point to limit a number of client devices connected to the remote access point subsequent to the wired uplink being unavailable.

In some embodiments, transmitting mechanism 660 can also transmit, to a remote access point, a configuration profile based on a low bandwidth uplink being an active uplink of a remote access point. Note that, the priorities are assigned based on the configuration profile. The profile may include one or more of: (1) a maximum number of client devices allowed to be connected to a remote access point in response to the remote access point being connected via a low bandwidth uplink to a network device; (2) a preconfigured list of client device identifiers identifying a subset of client devices that are allowed to associate with a remote access point in response to the remote access point being connected via a low bandwidth uplink to a network device; (3) a bandwidth assignment for each client device indicating a maximum bandwidth that each client device associated with a remote access point is allowed to use in response to the remote access point being connected via a low bandwidth uplink to a network device; (4) a set of firewall rules that define a set of applications or application categories that a remote access point may permit in response to the remote access point being connected via a low bandwidth uplink to a network device; and/or (5) client priorities that are dynamically calculated in response to the remote access point being connected via a low bandwidth uplink to a network device.

Specifically, the bandwidth assignment includes at least a maximum upstream bandwidth and a maximum downstream bandwidth, and wherein the maximum upstream bandwidth is different from the maximum downstream bandwidth. In some embodiments, the bandwidth assignment is defined on a per-user basis in which the amount of bandwidth used by each user is subject to a predefined value. In some embodiments, the bandwidth assignment is defined on a per-role basis in which all users assigned to a same user role share a predefined amount of bandwidth. In some embodiments, the bandwidth assignment is defined on a per-application basis in which the amount of bandwidth used by an application running on each client device is subject to a predefined value. An application running on the client devices may belong to an application access category that includes a voice access category, a video access category, a best effort access category, and a background access category. Also, an application running on the client devices may belong to one of an enterprise category or a non-enterprise category.

Assigning mechanism 670 generally assigns priorities to a plurality of client devices associated with a remote access point. Specifically, assigning mechanism 670 can dynamically assign priorities of client devices associated with the remote access point based at least on an application type or a traffic type corresponding to each client device. The client priorities are calculated based at least on a number of enterprise video sessions and a number of enterprise voice sessions that each client device is running. In particular, the priorities can be calculated as the sum of a number of voice sessions weighted by a first weightage given to the voice sessions and a number of video sessions weighted by a second weightage given to the video sessions.

Detecting mechanism 680 generally detects that an uplink of a remote access point is a low bandwidth uplink. Specifically, detecting mechanism 680 detects that a high bandwidth uplink of a remote access point becomes unavailable, whereas the remote access point is connected via a low bandwidth uplink to the network device.

Selecting mechanism 690 generally selects a set of client devices allowed to be associated with a remote access point. Specifically, selecting mechanism 690 can select a number of high priority clients allowed to access network in response to detecting that an uplink of a remote access point is a low bandwidth uplink. Here, the number of high priority clients is determined by a difference between a maximum allowed clients and an allowed client list. Moreover, the allowed client list is (1) statically configured by a network administrator as a list of MAC addresses for the allowed client devices; (2) configured by the network administrator as a list of user identifiers corresponding to the allowed client devices; or (3) configured by the network administrator based on a set of user roles corresponding to the allowed client devices.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
   dynamically assigning priorities of client devices associated with an access point based at least on an application type or a traffic type corresponding to each client device; and
   transmitting the priorities of the client devices to the access point in response to a wired uplink being unavailable, wherein the priorities of the client devices facilitate the access point to limit a number of client devices connected to the access point subsequent to the wired uplink being unavailable.

2. The medium of claim 1, further comprising:
   detecting that a high bandwidth uplink of a remote access point becomes unavailable, wherein the access point is connected via a low bandwidth uplink to a network device.

3. The medium of claim 1, further comprising:
   transmitting, to a remote access point, a configuration profile based on a low bandwidth uplink being an active uplink of the access point, wherein the priorities are assigned based on the configuration profile.

4. The medium of claim 3, wherein the profile comprises a maximum number of client devices allowed to be connected to a remote access point in response to the access point being connected via a low bandwidth uplink to a network device.

5. The medium of claim 3, wherein the profile comprises a preconfigured list of client device identifiers identifying a subset of client devices that are allowed to associate with a remote access point in response to the access point being connected via a low bandwidth uplink to a network device.

6. The medium of claim 3, wherein the profile comprises a bandwidth assignment for each client device indicating a maximum bandwidth that each client device associated with a remote access point is allowed to use in response to the access point being connected via a low bandwidth uplink to a network device.

7. The medium of claim 6, wherein the bandwidth assignment comprises at least a maximum upstream bandwidth and a maximum downstream bandwidth, and wherein the maximum upstream bandwidth is different from the maximum downstream bandwidth.

8. The medium of claim 6, wherein the bandwidth assignment is defined on a per-user basis in which the amount of bandwidth used by each user is subject to a predefined value.

9. The medium of claim 6, wherein the bandwidth assignment is defined on a per-role basis in which all users assigned to a same user role share a predefined amount of bandwidth.

10. The medium of claim 6, wherein the bandwidth assignment is defined on a per-application basis in which the amount of bandwidth used by an application running on each client device is subject to a predefined value.

11. The medium of claim 3, wherein the profile comprises a set of firewall rules that define a set of applications or application categories that a remote access point may permit in response to the access point being connected via a low bandwidth uplink to a network device.

12. The medium of claim 3, wherein the profile comprises client priorities that are dynamically calculated in response to the access point being connected via a low bandwidth uplink to a network device.

13. The medium of claim 12, wherein the client priorities are calculated based at least on a number of enterprise video sessions and a number of enterprise voice sessions that each client device is running.

14. The medium of claim 1, wherein an application running on the client devices belongs to an application access category that comprises a voice access category, a video access category, a best effort access category, and a background access category.

15. The medium of claim 1, wherein an application running on the client devices belongs to one of an enterprise category or a non-enterprise category.

16. The medium of claim 1, wherein the priorities are calculated based on the sum of a number of voice sessions weighted by a first weightage given to the voice sessions and a number of video sessions weighted by a second weightage given to the video sessions.

17. The medium of claim 1, further comprising:
selecting a number of high priority clients allowed to access a network in response to detecting that an uplink of the access point is a low bandwidth uplink, wherein the number of high priority clients is determined by a difference between a maximum allowed clients and an allowed client list.

18. The medium of claim 17, wherein the allowed client list is (1) statically configured by a network administrator as a list of MAC addresses for the allowed client devices; (2) configured by the network administrator as a list of user identifiers corresponding to the allowed client devices; or (3) configured by the network administrator based on a set of user roles corresponding to the allowed client devices.

19. A method comprising:
dynamically assigning, by a network device, priorities of client devices associated with a remote access point based at least on an application type or a traffic type corresponding to each client device; and
transmitting, by the network device, the priorities of the client devices to an access point in response to the wired uplink being unavailable,
wherein the priorities of the client devices facilitate the access point to limit a number of client devices connected to access point subsequent to the wired uplink being unavailable.

20. A system comprising:
at least one device including a hardware processor;
the system being configured to perform operations comprising:
dynamically assigning priorities of client devices associated with a remote access point based at least on an application type or a traffic type corresponding to each client device; and
transmitting the priorities of the client devices to an access point in response to the wired uplink being unavailable,
wherein the priorities of the client devices facilitate the access point to limit a number of client devices connected to the access point subsequent to the wired uplink being unavailable.

* * * * *